United States Patent
Martín Mariño

(10) Patent No.: US 11,565,621 B2
(45) Date of Patent: Jan. 31, 2023

(54) CARGO RING

(71) Applicant: ILLINOIS TOOL WORKS INC., Glenview, IL (US)

(72) Inventor: Iván Martín Mariño, Barcelona (ES)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 17/384,204

(22) Filed: Jul. 23, 2021

(65) Prior Publication Data

US 2022/0055523 A1 Feb. 24, 2022

(30) Foreign Application Priority Data

Jul. 31, 2020 (EP) ..................................... 20382705
May 11, 2021 (EP) ..................................... 21173264

(51) Int. Cl.
*B60P 7/08* (2006.01)

(52) U.S. Cl.
CPC .................................. *B60P 7/0807* (2013.01)

(58) Field of Classification Search
CPC ................................ B60P 7/0807; B60P 7/08
USPC .................... 410/101, 107, 11, 109, 106, 116
See application file for complete search history.

(56) References Cited

U.S. PATENT DOCUMENTS

| | | | | |
|---|---|---|---|---|
| 5,738,471 A | * | 4/1998 | Zentner | B60P 7/0807 410/101 |
| 5,749,686 A | * | 5/1998 | Butcher | B60P 7/13 410/121 |
| 6,065,917 A | * | 5/2000 | Shambeau | B60P 7/0807 410/112 |
| 6,113,328 A | * | 9/2000 | Claucherty | B60P 7/0807 410/116 |
| 6,256,844 B1 | * | 7/2001 | Wheatley | B61D 45/001 410/110 |
| 6,984,095 B2 | * | 1/2006 | Johnson | B60P 7/0807 410/101 |
| 7,811,036 B2 | * | 10/2010 | Armour | B60P 7/0807 410/109 |
| 7,815,405 B2 | * | 10/2010 | Aftanas | B60P 7/0815 410/104 |
| 8,845,250 B1 | * | 9/2014 | Helms | B60P 7/0807 410/106 |
| 9,896,018 B2 | * | 2/2018 | Hemphill | B60P 7/0807 |
| 2004/0080193 A1 | | 4/2004 | Tong | |
| 2005/0244242 A1 | | 11/2005 | Johnson | |
| 2016/0137299 A1 | * | 5/2016 | Eilken | B64D 9/00 410/106 |

FOREIGN PATENT DOCUMENTS

DE 202008008418 U1 10/2008
FR 2905091 A1 2/2008

* cited by examiner

*Primary Examiner* — D Glenn Dayoan
*Assistant Examiner* — Sunsurraye Westbrook
(74) *Attorney, Agent, or Firm* — Thompson Hine LLP

(57) ABSTRACT

A cargo ring, of the type used for lashing objects in a luggage or loading space of a vehicle is provided. The cargo ring includes a retainer member, extending within a first plane, and having at least one aperture configured to receive lashing for securing the object. The cargo ring further includes a fastener member, extending from the retainer member within a second plane oriented so as to intersect with the first plane, operably mountable to a surface of the vehicle. The retainer member is integrally formed with the fastener member.

15 Claims, 8 Drawing Sheets

CARGO RING

TECHNICAL FIELD

The invention relates to a cargo ring, of the type used for lashing objects in a luggage or loading space of a vehicle.

INTRODUCTION

Cargo rings are typically provided fastened to the floor of a trunk in a vehicle such as a motor vehicle. The cargo ring may be secured by welding or a fastening bolt or such like. Such cargo rings include lashing eyelets, openings or retainer members through which suitable lashing, for example lashing straps or elasticated cord, can be guided or fastened to the cargo rings in order to secure objects to be transported against undesired slipping.

Known cargo rings are formed from a retainer member welded to a plate. FIG. 1, for example, illustrates a known cargo ring 10, including a fastener member or plate 20 mounted to a surface of the vehicle body by a bolt 50. A retainer member 30 in the form of an angled U-shaped rod is mounted to the fastener member 20 and secured by several weld joints 40. Thus, manufacture of the cargo ring 10 requires a pre-welding step in the fabrication process.

Weld joints 40 may also be weak points when the load is lashed to the cargo ring 10. Thus, relatively large welding surfaces are required for good weld joints and, consequently, the retainer member and the fastener member must be increased in size, leading to devices of bulky design and which use an excess of material.

Furthermore, if a significant proportion of the apparatus is devoted to the welding joints then the dimensions of the retainer member are constrained and retainer members which are small are difficult for a user to fasten lashing to.

It is therefore an object of the invention to provide a robust, lightweight cargo ring which is simpler and cheaper to manufacture. It is a further object to provide a compact cargo ring which maximises the area available for receiving lashing and securing objects without losing any of the required strength and/or functionality.

SUMMARY

According to a first aspect of the invention, there is provided a cargo ring for securing an object in the luggage or loading space of a vehicle, including:

a retainer member, extending within a first plane, comprising at least one aperture configured to receive lashing for securing the object, a fastener member, extending from said retainer member within a second plane oriented so as to intersect with said first plane, operably mountable to a surface of the vehicle, and wherein said retainer member is integrally formed with said fastener member.

Advantageously, said fastener member includes a locking element protruding from a peripheral edge in a direction substantially normal to said second plane and away from said retainer member, configured to lockingly engage with a corresponding surface feature of the luggage or loading space.

In this way, the cargo ring can be mounted to the surface of a vehicle in a fixed orientation and may be more securely fastened by a fastening bolt or welding or such like. Where the cargo ring is fastened with a fastening bolt, or similar, the locking element allows the cargo ring to be mounted in such a way as to prevent rotation relative to the surface.

Advantageously, a perimeter of said aperture is provided with a reinforcing lip. Preferably, said reinforcing lip is provided by a deformed edge of said perimeter. Advantageously, said fastener member includes at least one reinforcing member. In these ways, the cargo ring can have increased robustness without bulky design or excess material. The cargo ring can therefore secure heavier or bulkier loads without failing or being deformed.

Preferably, said at least one reinforcing member reinforcingly connects said fastener member and said retainer member. In this way, the retainer member will be more robust and resist deformation out of the first plane or relative to the fastener member.

According to a second aspect of the invention, there is provided a method of forming a cargo ring for securing an object in the luggage or loading space of a motor vehicle, said method including the steps of: (a) providing a sheet, (b) stamping said sheet so as to form and orient a retainer member and a fastener member in respective first and second planes, wherein said second plane is oriented so as to intersect with said first plane. Thus, the cargo ring may be formed simply and cheaply from a single component material with minimal fabrication steps.

According to a third aspect of the invention, there is provided a cargo ring assembly for securing an object in the luggage or loading space of a vehicle, including:

a retainer member, comprising a fixing portion extending within a first plane and defining at least one enclosure configured to receive lashing for securing the object, and at least one anchor portion extending from said retainer member within a second plane oriented so as to intersect with said first plane, a fastener member, comprising a mounting plate mountable to a surface structure of the vehicle and configured to retainingly receive and lock said anchor portion of said retainer member.

In this way, an assembly may be provided from two simple components which can be mounted to a surface without requiring pre-fabrication or welding. Such a modular design provides flexibility to replace the retainer member, for example with a specialised design for securing certain loads or should a retainer member become damaged.

Advantageously, the mounting plate of said cargo ring includes at least one lateral engagement portion adapted to couplingly and aligningly engage with said anchor portion, during use. Preferably, said mounting plate includes two lateral engagement portions parallelly arranged on opposing edges of said mounting plate. In these ways, the assembly may be mounted to a surface with quick and easy orientation of the respective parts.

Advantageously, said at least one anchor portion includes a projection and said mounting plate includes an opening or recess adapted to lockingly engage with said projection during use. Thus, when mounted to a surface, the fastener member may lock the retainer member in two ways. Firstly, the anchor portion is clamped against the surface by the mounting plate and, secondly, the projection engages with the corresponding opening to prevent the anchor portion moving laterally with respect to the fastener member.

BRIEF DESCRIPTION OF THE DRAWINGS

Embodiments of the invention are now described, by way of example only, hereinafter with reference to the accompanying drawings, in which.

In the drawings, like reference numerals refer to like parts.

DETAILED DESCRIPTION

Figure 1:
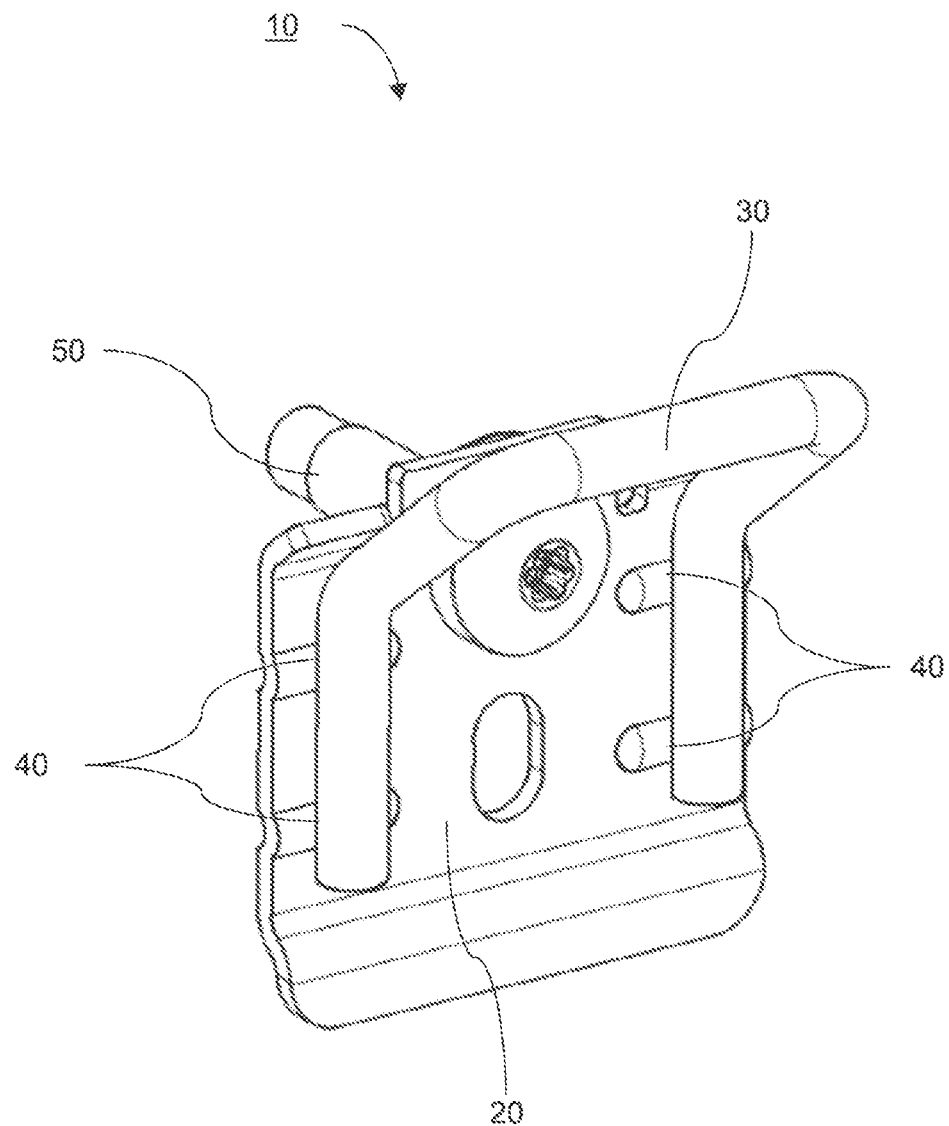
FIG. 1 shows a perspective view of a cargo ring of the prior art.

The described example embodiments relate to cargo rings suitable for securing an object with lashing. The embodiments of the invention are normally applied in the luggage or loading space of a vehicle. Although the invention is described with respect to luggage or loading space, the invention is not restricted to luggage or loading space but may also be used in other spaces requiring securing an object with lashing to a vehicle.

Certain terminology is used in the following description for convenience only and is not limiting. The words 'lower' and 'upper' designate directions in the drawings to which reference is made and are with respect to the described component when assembled and mounted. The words 'inner', 'inwardly' and 'outer', 'outwardly' refer to directions toward and away from, respectively, a designated centreline or a geometric centre of an element being described (e.g. central axis), the particular meaning being readily apparent from the context of the description.

Further, as used herein, the terms 'connected', 'attached', 'coupled', 'mounted' are intended to include direct connections between two members without any other members interposed therebetween, as well as, indirect connections between members in which one or more other members are interposed therebetween. The terminology includes the words specifically mentioned above, derivatives thereof, and words of similar import.

Further, unless otherwise specified, the use of ordinal adjectives, such as, 'first', 'second' etc. merely indicate that different instances of like objects are being referred to and are not intended to imply that the objects so described must be in a given sequence, either temporally, spatially, in ranking or in any other manner.

Figure 2:
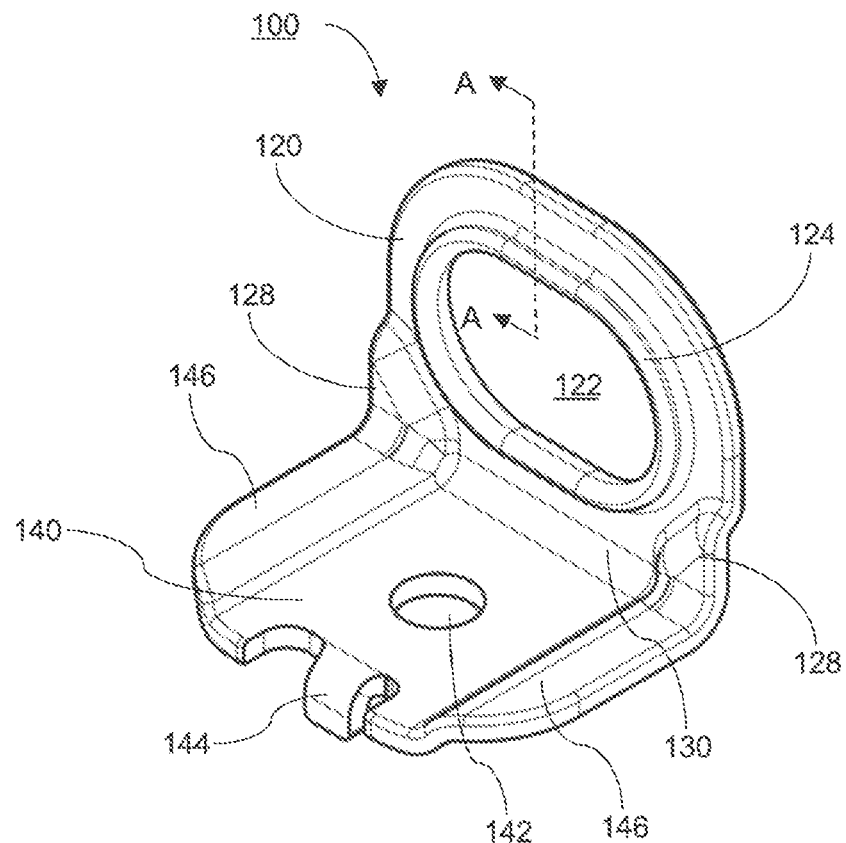
FIG. 2 shows a perspective view of a first example embodiment of a cargo ring of a first aspect of the invention.

Referring now to FIG. 2, there is shown a first cargo ring 100 according to the first aspect of the invention including a retainer member 120 extending within a first plane and configured to receive lashing for securing an object. The cargo ring 100 further includes a fastener member 140 which is operably mountable to a surface of a vehicle in order to secure lashing and cargo to the vehicle. The fastener member 140 extends from the retainer member 120 within a second plane oriented to intersect the first plane. The improvement comprises integrally forming the retainer member 120 with the fastener member 140 as will be explained below.

The retainer member 120 is provided as a substantially annular plate, extending within the first plane, with an aperture 122 extending therethrough. The annular plate is shaped as an elongate oval, including a pair of mutually-opposed straight sides separated by a pair of mutually-opposed curved ends.

Figure 3:
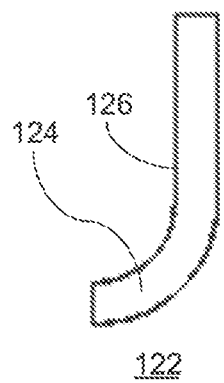
FIG. 3 shows a cross-sectional view of a reinforcing lip of the example of FIG. 2.

The retainer member 120 is formed with a reinforcing lip 124 around the perimeter of the aperture 122. A representative cross-sectional shape of the reinforcing lip 124 is shown as an example in FIG. 3, taken at section A-A. As shown therein, the perimeter curves out of the first plane towards a central axis of the aperture 122 on the inner side 126 of the annular plate, that is the side of the annular plate oriented towards the fastener member 140.

The fastener member 140 is provided as a substantially rectangular plate, extending away from the retainer member 120 within the second plane. The second plane is oriented perpendicular to the first plane and arranged such that the rectangular plate is oriented with a first of its longer sides meeting the annular ring along a first of its straight sides. In this way, the fastener member 140 and retainer member 120 are integrally joined along a continuous L-profiled channel 130.

The fastener member 140 is provided with a bolthole 142 extending through the centre of the plate. The bolthole 142 is appropriately sized to receive a fastening bolt suitable for operably mounting the fastener member 140 to a surface of the vehicle body.

The rectangular plate includes a pair of mutually-opposed shorter sides. Each of the shorter sides is deformed out of the second plane to form a pair of parallel elongate ribs 146. The elongate ribs 146 act as reinforcing ribs to maintain the rigidity of the fastener member 140.

Each elongate rib 146 extends beyond the shorter sides of the fastener onto the retainer member 120. Thus, each rib extends from the fastener member 140, around the channel 130, to form a respective rib portion 128 on the retainer member 120. The rib portions 128 are deformed out of the first plane of the annular ring. The rib portions 128 are positioned at opposing ends of the L-profiled channel 130, adjacent respective curved ends of the annular ring. By extending from the retainer member 120 to the fastener member 140 in this way, the reinforcing ribs thereby not only provide rigidity to the fastener member 140 but additionally reinforce the retainer member 120 through the rib portions 128. The connection or joint between the retainer member 120 and fastener member 140 in the channel 130 is also reinforced.

The rectangular plate includes a second longer side, provided in a position mutually-opposed to the first longer side. The second longer side has a locking element provided thereon. The locking element is formed as a curved protrusion 144. The 144 protrusion curves out of the second plane towards the underside of the annular plate. The protrusion 144 is positioned and oriented to lockingly engage with a corresponding groove or recess on the surface of the vehicle body when the cargo ring 100 is mounted to the surface using a fastening bolt through the bolthole 142. With the protrusion 144 locked into the surface the cargo ring 100 is mounted in a fixed rotational orientation with respect to the surface.

Figure 4:
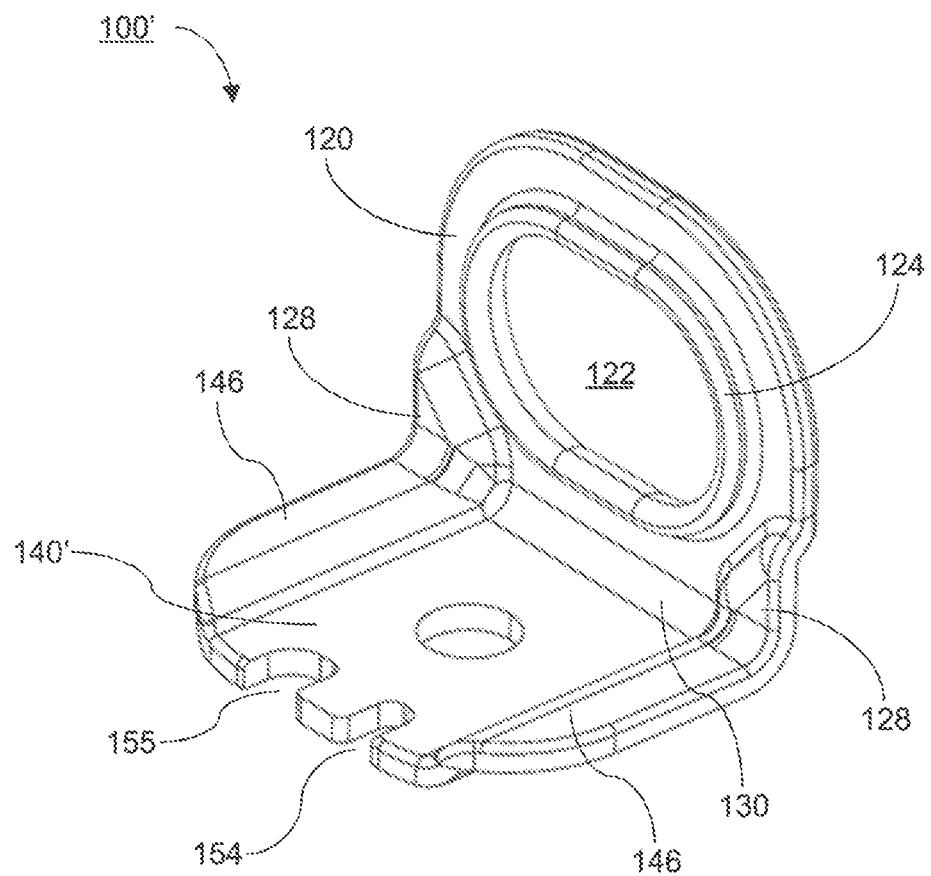
FIG. 4 shows a perspective view of the example of FIG. 2 with an alternative anti-rotation feature.

An alternative example of a cargo ring 100' according to the first aspect of the invention is shown in FIG. 4, in which the second longer side of the fastener member 140' has an alternative locking element provided thereon. Other features of the cargo ring 100' are substantially the same as the example shown in FIGS. 2 and 3. Thus, the second longer side is provided with a pair of rounded notches 154, 155, separated by a portion of the rectangular plate. The rounded notches 154, 155 extend through the rectangular plate and are positioned and oriented to be lockingly engageable with a corresponding stud welded on the surface of the vehicle body when the cargo ring 100' is mounted to it. With one or both rounded notches 154, 155 engaged with a corresponding stud, the cargo ring 100' is mounted in a fixed rotational orientation with respect to the surface.

Figure 5A:
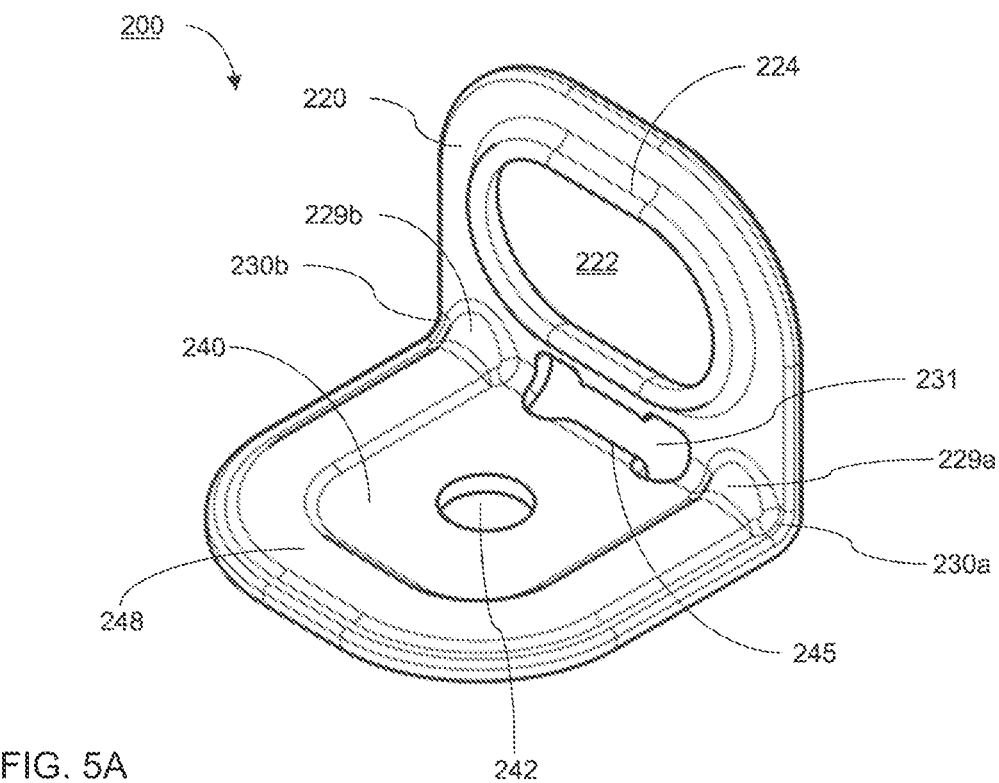
FIGS. 5A-5B show FIG. 5A as a perspective view and FIG. 5B as a rear view of the cargo ring of a second example embodiment of a cargo ring of a first aspect of the invention.
Figure 5B:
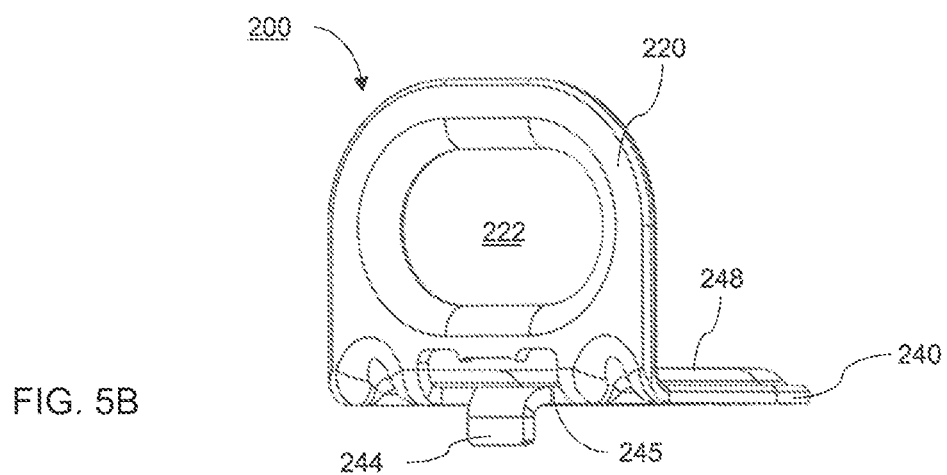

Referring now to FIGS. 5A-5B, there is shown a second cargo ring 200 embodiment according to a first aspect of the invention, which includes a number of aspects in common with the first embodiment. Thus, the cargo ring 200 comprises a retainer member 220 with an annular ring in a first plane arranged mutually perpendicular and integrally formed with a fastener member 240 having a rectangular plate in a second plane. The retainer member 220 includes an aperture 222 with a reinforced lip 224. The fastener member 240 includes a bolthole 242 for receiving a fastening bolt.

The second plane is oriented perpendicular to the first plane and arranged such that the rectangular plate is oriented with a first of its longer sides arranged adjacent the annular ring along a first of its straight sides. Both the first longer side and the first straight side include elongate cut-out sections arranged such that with the fastener member 240 and retainer member 220 integrally joined the cut-out sections form a single elongate aperture 231. In this way, the fastener member 240 and retainer member 220 are integrally joined by first and second L-profiled channel sections 230a, 230b, separated by the elongate aperture 231.

The rectangular plate is provided with a reinforcing member. The reinforcing member is an elongated ridge 248 extending around the perimeter region of the first shorter side, second longer side, and side shorter side. The elongate ridge 248 is formed on the top side of the rectangular plate with a complementary channel formed on its underside.

The elongate ridge 248 extends from the fastener member 240, around the first and second channel sections 230a, 230b, to form ridge portions 229a, 229b on the retainer member 220. By extending from the retainer member 220 to the fastener member 240 in this way, the elongate ribs 229a, 229b not only provide rigidity to the fastener member 240 but additionally reinforce the retainer member 220. The first and second L-profiled channel sections 230a, 230b between the retainer member 220 and fastener member 240 are also reinforced.

A locking element is provided in the form of a curved protrusion 244. The curved protrusion 244 of the example of FIGS. 5A-5B is substantially the same as the curved protrusion of FIG. 2, other than it depends from an edge portion 245 of the elongate cut-out section on the first longer side of the rectangular plate. The protrusion 244 lockingly engages the cargo ring 200 in a fixed rotational orientation when mounted to the surface of the vehicle body.

Figure 6:
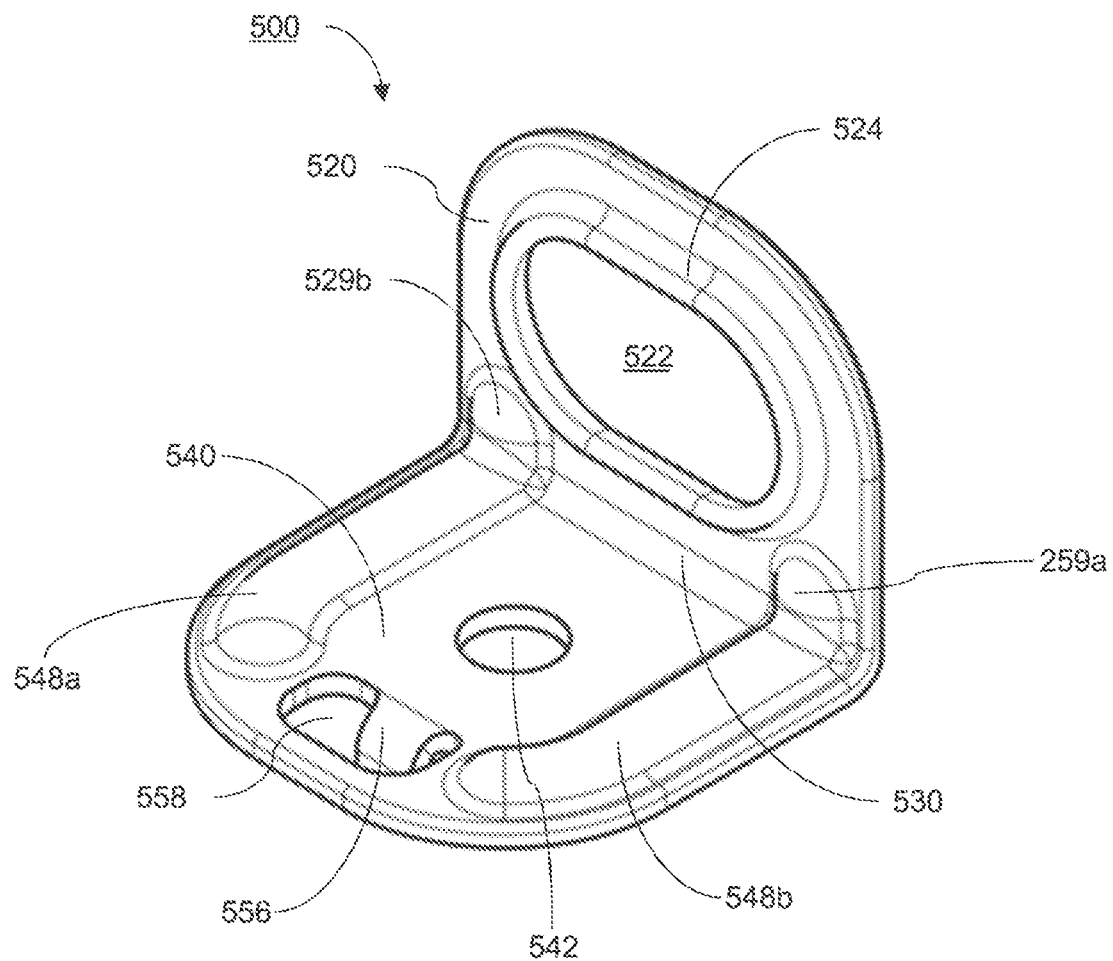
FIG. 6 shows a perspective view of a third example embodiment according to a first aspect of the invention.

Referring now to FIG. 6 there is shown a third cargo ring 500 embodiment according to a first aspect of the invention, which includes a number of aspects in common with the second embodiment. Thus, the cargo ring 500 comprises a retainer member 520 with an annular ring in a first plane arranged mutually perpendicular and integrally formed with fastener member 540 having a rectangular plate in a second plane.

The retainer member 520 is integrally joined with the fastener member 540 by an L-profiled channel 530 formed adjacent to both the first straight side of retainer member 520 and the first longer side of the fastener member 540. The L-profiled channel 530 extends substantially the whole length of both the first longer side and the first straight side.

The rectangular plate of the fastener member 540 is provided with a pair of reinforcing members in the form of elongated ridges 548a, 548b extending around the perimeter region of the first and second shorter sides. Each elongated ridge 548a, 548b extends from the fastener member 540 around the L-profiled channel 530 to form ridge portions 529a, 529b on the retainer member.

A slot 558 is provided in close proximity to the perimeter region of the second longer side of the rectangular plate of the fastener member 540. The slot 558 extends through the rectangular plate and having a locking element 556 extending away from an inner edge of the slot 558 in a direction substantially perpendicular to the main surface of the rectangular plate. The locking element 556 may be in the form of a protrusion 556 that is bent towards an outer surface of the rectangular plate. This curved protrusion 556 may be substantially the same shape as the curved protrusion 244 shown in FIGS. 2 and 5 and which is adapted to lockingly engage the cargo ring 500 in a fixed rotational orientation in the same manner when mounted to the surface of the vehicle body.

The cargo rings 100, 100', 200 and 500 of FIGS. 2 to 6 are formed from a single sheet, according to a second aspect of the invention. The single sheet is preferably metal. Example materials include stainless steel, aluminium or any other suitable metal or metal compound/alloy that can be provided as a sheet with thickness in the range 1 mm to 5 mm. The sheet is provided flat and is stamped by suitable pressing apparatus so as to form the cargo ring in which the retainer member and fastener member are provided in their respective first and second planes. Thus, stamping the flat sheet forms mutually perpendicular retainer member and fastener member.

Referring to the example embodiment shown in FIG. 2, it is understood that during the manufacturing process, the aperture 122 is punched into the retainer member 120, the bolthole 142 is punched into the fastener member 140, the perimeter of the aperture 122 is deformed so as to form the reinforcing lip 124, a portion of the second longer side of the rectangular plate is deformed so as to form the curved protrusion 144, and the elongate ribs 146 and the rib portions 128 are formed.

Similarly, when manufacturing the cargo ring 200 shown in FIG. 4, the mutually perpendicular retainer member 220 and fastener member 240 are formed, the elongate aperture 231 is punched, and the reinforcing lip 224, the elongate ridge 248 and curved protrusion 244 are formed.

The manufacturing process may also form further features of the cargo rings, for example, by embossing, deep drawing, tapping, cutting or bending. It will be appreciated that features of a cargo ring may be provided in the sheet in any suitable order. Thus, as the sheet is stamped to deform the mutually perpendicular retainer member and fastener member, one or more of the bolthole, aperture, elongate rib, elongate ridge, reinforcing member, curved protrusion, elongate rib or reinforcing lip may be formed sequentially or concurrently utilising the same manufacturing tool. Alternatively, any one of these features may be provided before or after passing through the forming tool, or by any suitable pre- or post-processing techniques.

By integrally forming the retainer member and the fastener member, the cargo rings of FIGS. 2 to 6 optimise the area of the respective annular plate and aperture. Each aperture is thus sufficiently dimensioned to allow the user to easily secure objects to the retainer members via one or more lashings. Furthermore, each aperture has a large area relative to the cargo ring, making efficient use of material.

By including a reinforcing lip, each retainer member may be robust despite not comprising a substantial amount of material. Additionally, or alternatively, inclusion of a reinforcing member may provide a robust fastener member and retainer member, as well as a reinforced join therebetween. Hence, the cargo ring design is further optimised, and robustness is further improved.

Figure 7A:
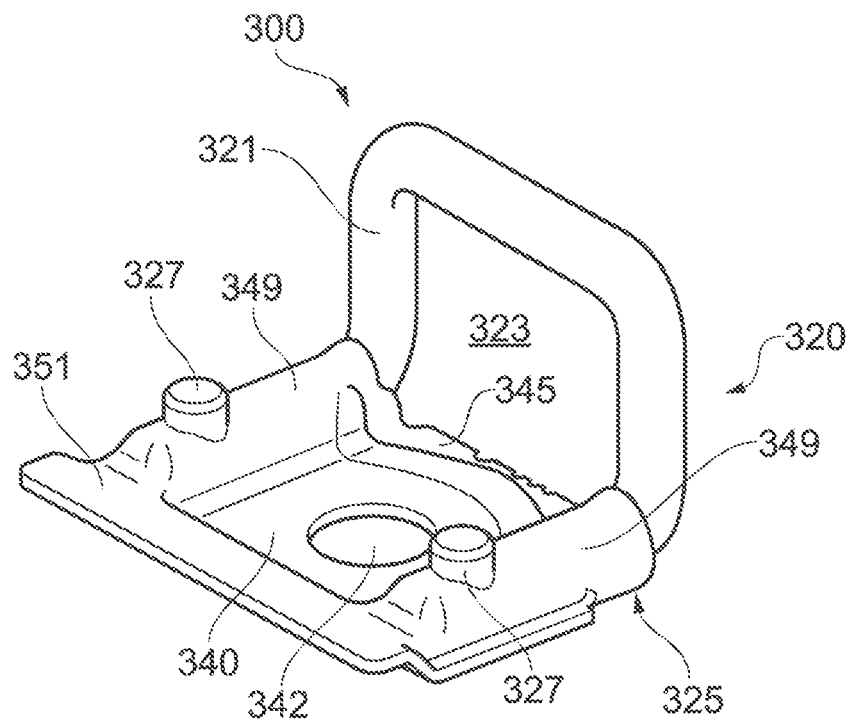
FIGS. 7A-7B show FIG. 7A as a perspective view and FIG. 7B as a rear perspective view of an example embodiment of a cargo ring of a third aspect of the present invention.
Figure 7B:
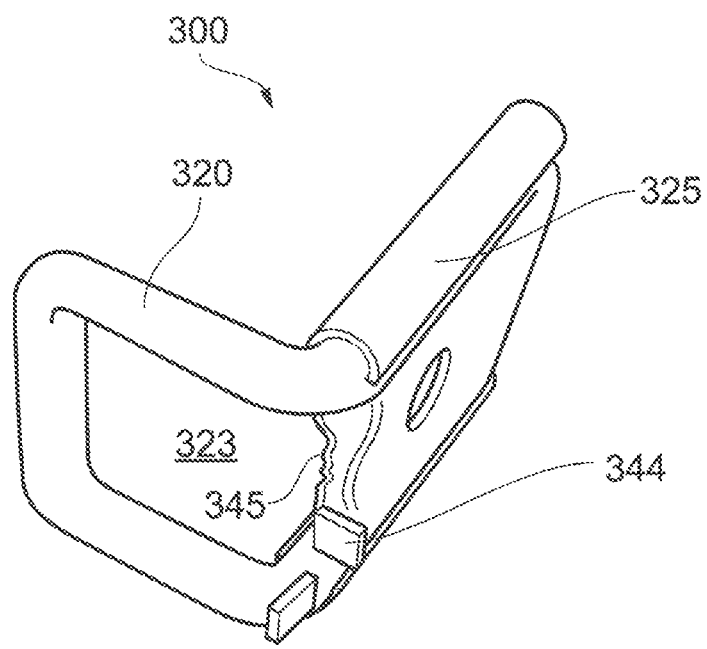

Referring now to FIGS. 7A-7B, there is shown another embodiment of a cargo ring assembly 300 according to the third aspect of the invention, the assembly including a retainer member 320, extending within a first plane, including a fixing portion 321 for receiving lashing in order to secure an object. The retainer member 320 also includes two anchor portions parallelly extending in a second plane, perpendicular to the first plane. A fastener member 340 is provided in a third plane, oriented parallel to the second plane, mountable to the surface or surface structure of a vehicle via a bolthole 342. The fastener member 340 retainingly receives and locks the anchor portions when the fastener member 340 is mounted to the surface or surface structure.

The retainer member 320 is provided as a deformed rod. A central portion of the rod forms the fixing portion 321 in the form of a U-shaped enclosure 323. The U-shaped enclosure 323 is contained within the first plane.

The anchor portions 325 are formed from two end portions of the rod, bent perpendicular to the first plane to extend in mutually parallel directions within the second plane. Locking projections 327 are provided near the terminus of each anchor portion 325, projecting in a direction both parallel to the first plane and mutually parallel to each other.

The fastener member 340 is provided as a substantially rectangular plate, extending within the third plane. A bolthole 342 extends through the centre of the rectangular plate in common with other examples.

The fastener member 340 is provided with a curved protrusion 344 along a first longer edge 345. The curved protrusion 344 is configured to lockingly engage with the surface when the cargo ring 300 is clamped to a surface.

Ridges 349 are provided laterally along each of the opposing shorter edges of the rectangular plate. The underside of each ridge 349 forms a channel, with a first end oriented to open at the first longer edge 345 of the rectangular plate. The second end of each channel is closed. Each ridge 349 is provided with an engagement hole 351 which extends through to the channel underneath.

The rectangular plate is provided with a ledge 351 along its second longer edge. The ledge 351 is raised out of the second plane on the top side of the rectangular plate. The ledge and the ridges may collectively or individually be considered reinforcing members due to the fact that they reinforce the rectangular plate.

To assemble the cargo ring 300, the retainer member 320 is engaged with the fastener member 340 such that each anchor portion 325 is received into a channel on the underside of a ridge 349. In this way, the retainer member 320 is received by the fastener member 340 such that the third plane is parallel to the second plane.

The anchor portions 325 extend substantially the full length of the channel to allow a projection 327 to be received into each engagement hole 351. Thus, when the fastener member 340 is operably mounted to a surface of the vehicle, the anchor portions 325, and thereby the retainer member, are couplingly engaged in the channel in two ways. Firstly, the anchor portions 325 are clamped against the surface by the channel. Secondly, the projections 327 couple with the engagement hole 351 preventing the anchor portions 325 moving laterally within the channel.

With the retainer member 320 couplingly engaged, the fixing portion 321 extends away from the fastener member 340 adjacent the first longer edge 345. The fixing portion 321 extends perpendicular to both the second plane and the third plane, and away from the surface onto which the cargo ring is mounted.

Figure 8A:
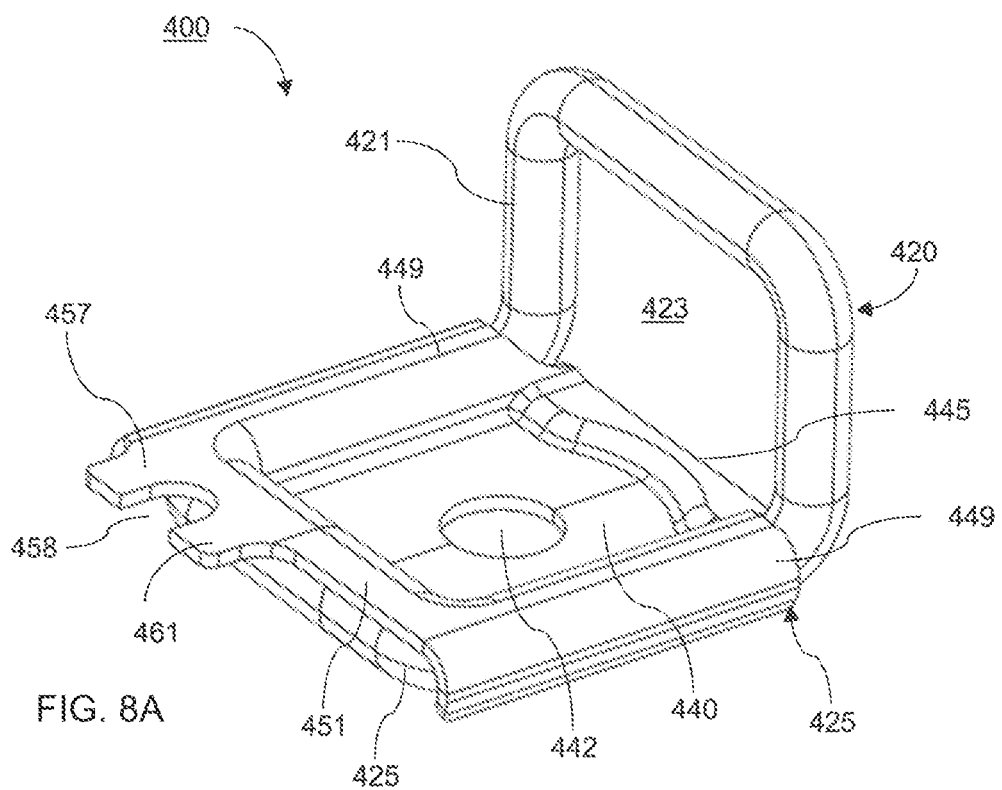
FIGS. 8A-8B show FIG. 8A as a perspective view and FIG. 7B as a lower perspective view of a further example embodiment of a cargo ring of the third aspect.
Figure 8B:
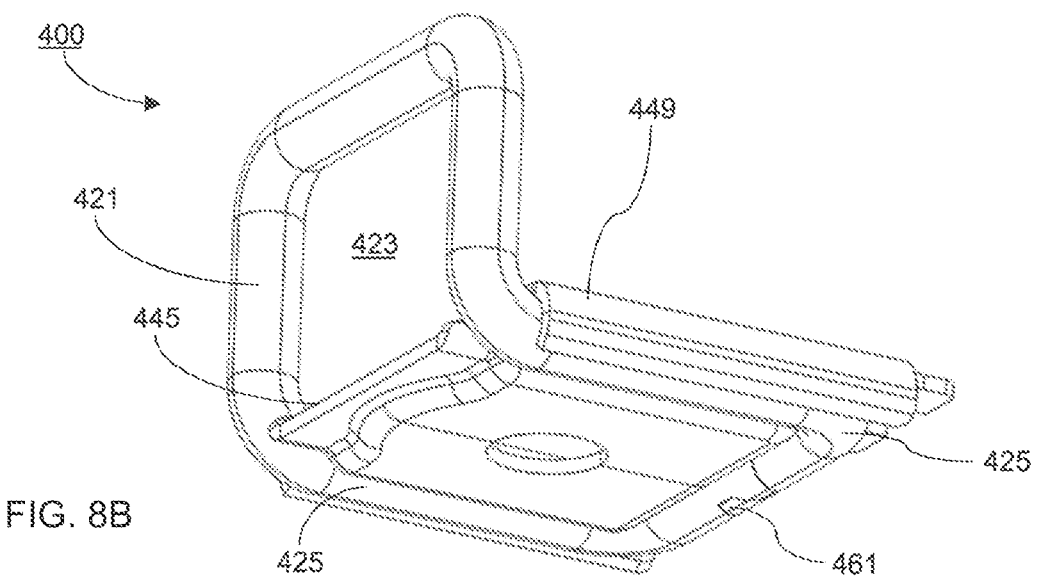

Referring now to FIGS. 8A-8B, there is shown a second embodiment of the cargo ring assembly 400 according to a third aspect of the invention, which includes a number of aspects in common with the first embodiment. Here, the cargo ring assembly 400 includes the retainer member 420 having a first U-shaped enclosure in a first plane that is formed from a rod. The retainer 420 further includes an anchor portion 425 in a second plane that is substantially perpendicular to the first plane. A fastener member 440 may be provided in a third plane oriented substantially parallel to the second plane. The fastener member 440 is adapted to retainingly receive and lock the anchor portion 425 when mounted to the surface or any surface structure.

The anchor portion 425 may be in the form of a second U-shaped enclosure formed by the rod. Each arm of the deformed rod of the first U-shaped enclosure is seamlessly extending into a corresponding arm of the second U-shaped enclosure. The two open end portions of the deformed rod may be welded together so as to form a continuous loop including both the anchor portion 425 and the fixing portion 421, thereby, providing increased strength to the retainer member.

Similar to the fastener member 340 shown in FIGS. 7A-7B, the fastener member 440 may include ridges 449 provided laterally along each of the opposing shorter edges, as well as, a ledge 451 along the second longer edge of the rectangular plate. The underside of each ridge 449 forms a channel with a first end oriented so as to provide an opening at the first longer edge 445 of the rectangular plate.

The second end of each channel opens to an elongate recess on the underside of the ridge 449. The elongate recess may be provided with a bracket 461 depending away from the rectangular plate.

The second longer side has a locking element provided thereon. The locking element is formed as a projecting tab 457 with a notch 458. The notch 458 is positioned and oriented to be lockingly engageable with a corresponding stud that may be welded on the surface of the vehicle body. With the notch 458 engaged with a corresponding stud, the cargo ring 400 is mounted in a fixed rotational orientation with respect to the surface.

During assembly, the second U-shaped enclosure is placed into the channels and enclosure on the underside of the ridges 449 and ledge 451. The bracket 461 may be crimped so as to wrap around a portion of the deformed rod forming the base of second U-shaped enclosure, thereby, securing the anchor portion to the fastener member 440.

With the retainer member 420 secured to the fastener member 440, the fixing portion 421 now extends into a direction perpendicular to and away from both the second plane and the third plane of the fastener member 440.

In this example, the anchor portion 425 is both clamped against the underside of the rectangular plate and retained relative to the fastener member 440 by the clasp 461.

Figure 9:
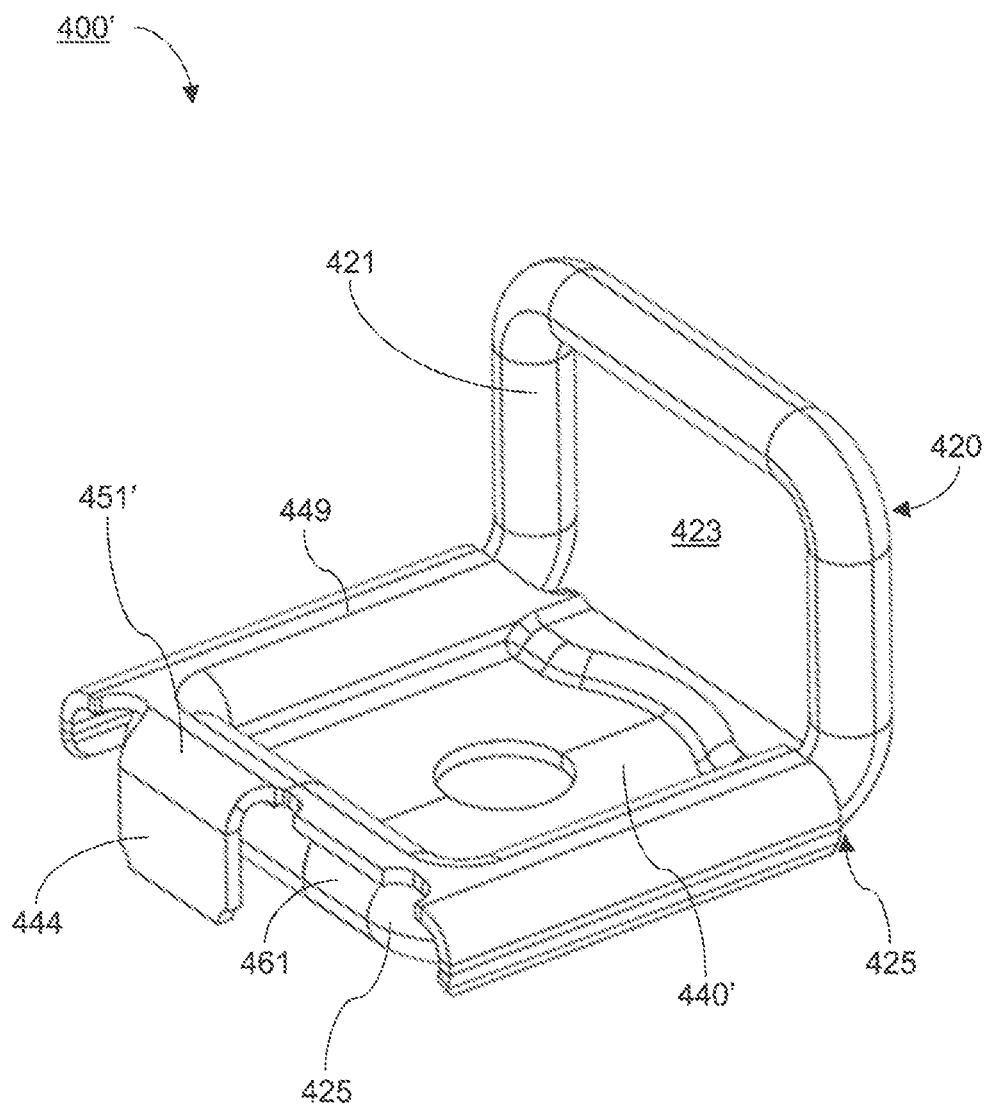
FIG. 9 shows a perspective view of the example of FIGS. 8A-8B with an alternative anti-rotation feature.

FIG. 9 shows an alternative example of a cargo ring assembly 400' according to the third aspect of the invention. Here, the second longer side of the fastener member 440' has an alternative locking element 444 provided thereon. Other features of the cargo ring 400' are substantially the same as the embodiment shown in FIGS. 8 a) and 8 b). The locking element 444 is formed by a curved protrusion projecting from the edge of the ledge 451'. The protrusion curves out and away from the ledge 451' in a direction substantially perpendicular to the annular plate. The protrusion 444 may be positioned and oriented so as to lockingly engage with a corresponding groove or recess provided on the surface of the vehicle body, i.e. in a similar way to the protrusion 144 described in the example of FIG. 2.

In alternative embodiments, the retainer member may be couplingly engaged with the fastener member using other means. For example, the engagement may only rely upon the clamping of one or more anchor portions in a channel, or the coupling provided by one or more projection with an engagement hole. It is understood by the person skilled in the art that any other suitable coupling means may be used, additionally or alternatively.

Further improvements and alternatives may provide within the scope of the disclosed inventions. For example, the reinforcing lip may be oriented to extend towards a normal to the first plane taken from an outer surface of the annular plate. Regardless of the orientation of the lip, the lip may extend only partially around the perimeter. Or, the lip may be replaced by other reinforcing features such as a rib surrounding the perimeter, or a series of ribs arranged at angles to the perimeter.

The annular plate of the example embodiments shown in FIGS. 2 to 6 may be replaced by a rod defining an enclosure (such as disclosed in FIGS. 7A-7B) and integrally formed with the fastener member.

The U-shaped enclosures of the examples of FIGS. 7A to 9 may be replaced by an annular ring arranged in the first plane and with anchor portions extending from a surface or an edge of the annular ring.

The reinforcing members of the cargo rings shown in the above examples are interchangeable with each other. Each reinforcing member may only be provided on the fastener member, or on the retainer member, or may extend from the fastener member to the retainer member.

What is claimed is:

1. A cargo ring for securing an object in the luggage or loading space of a vehicle, comprising:
   a retainer member, extending within a first plane, comprising at least one aperture configured to receive lashing for securing the object,
   a fastener member, extending from said retainer member within a second plane oriented so as to intersect with said first plane, operably mountable to a surface of the vehicle, and
   wherein said retainer member is integrally formed with said fastener member;
   wherein said fastener member comprises a locking element protruding from a peripheral edge in a direction substantially normal to said second plane and away from said retainer member, configured to lockingly engage with a corresponding surface feature of the luggage or loading space.

2. A cargo ring according to claim 1, wherein a perimeter of said aperture comprises a reinforcing lip.

3. A cargo ring according to claim 2, wherein said reinforcing lip is provided by a deformed edge of said perimeter.

4. A cargo ring according to claim 1, wherein said fastener member comprises at least one reinforcing member.

5. A cargo ring according to claim 4, wherein said at least one reinforcing member reinforcingly connects said fastener member and said retainer member.

6. A cargo ring assembly for securing an object in the luggage or loading space of a vehicle, comprising:
   a retainer member, comprising a fixing portion extending within a first plane and defining at least one enclosure configured to receive lashing for securing the object, and at least one anchor portion, extending from said retainer member within a second plane oriented so as to intersect with said first plane,
   a fastener member, comprising a mounting plate mountable to a surface structure of the vehicle and configured to retainingly receive and lock said anchor portion of said retainer member.

7. A cargo ring assembly according to claim 6, wherein said mounting plate comprises at least one lateral engagement portion adapted to couplingly and aligningly engage with said anchor portion, during use.

8. A cargo ring assembly according to claim 7, wherein said mounting plate comprises two lateral engagement portions parallelly arranged on opposing edges of said mounting plate.

9. A cargo ring assembly according to claim 6, wherein said at least one anchor portion comprises a projection and wherein said mounting plate comprises an opening or recess adapted to lockingly engage with said projection during use.

10. A cargo ring assembly for securing an object in the luggage or loading space of a vehicle, comprising:
    a retainer member, comprising a fixing portion extending within a first plane and defining at least one enclosure configured to receive lashing for securing the object, and at least one anchor portion, extending from said retainer member within a second plane oriented so as to intersect with said first plane,
    a fastener member, comprising a mounting plate mountable to a surface structure of the vehicle and configured to retainingly receive and lock said anchor portion of said retainer member;
    wherein said fixing portion has a first U-shaped enclosure formed from a rod, the first U-shaped enclosure including spaced apart arms running toward an open end of the first U-shaped enclosure, wherein said anchor portion has a second U-shaped enclosure formed from the rod, the second U-shaped enclosure including spaced apart arms running toward an open end of the second U-shaped enclosure, wherein each arm of the first U-shaped enclosure extends seamlessly into a corresponding one of the arms of the second U-shaped enclosure.

11. A cargo ring assembly according to claim 10, wherein said mounting plate comprises at least one lateral engagement portion adapted to couplingly and aligningly engage with said anchor portion, during use.

12. A cargo ring assembly according to claim 11, wherein said at least one lateral engagement portion comprises two lateral engagement portions parallelly arranged on opposing edges of said mounting plate.

13. A cargo ring assembly according to claim 12, wherein said fastener member is a substantially rectangular plate, wherein said two lateral engagement portions comprise ridges provided along opposing shorter edges of said fastener member, wherein a ledge is provided along a second longer edge of said fastener member, and wherein an underside of each ridge forms a channel with a first end oriented so as to provide an opening at a first longer edge of said fastener member.

14. A cargo ring assembly according to claim 13, wherein said second U-shaped enclosure is positioned in said channels on the underside of said ridges and an underside of said ledge.

15. A cargo ring assembly according to claim 10, wherein two open end portions of the rod are welded together so as to form a continuous loop including both the anchor portion and the fixing portion.

* * * * *